(12) United States Patent
Namazian et al.

(10) Patent No.: US 7,303,598 B1
(45) Date of Patent: Dec. 4, 2007

(54) LIQUID FUEL PREPROCESSOR

(75) Inventors: Mehdi Namazian, Palo Alto, CA (US); John T. Kelly, Saratoga, CA (US)

(73) Assignee: Altex Technologies, Santa Clara, CA (US)

( * ) Notice: Subject to any disclaimer, the term of this patent is extended or adjusted under 35 U.S.C. 154(b) by 565 days.

(21) Appl. No.: 10/796,592

(22) Filed: Mar. 5, 2004

(51) Int. Cl.
 *C01B 3/24* (2006.01)
(52) U.S. Cl. ............... 48/197 R; 48/127.9; 48/198.3; 208/79; 422/187; 422/189; 422/198; 422/211
(58) Field of Classification Search ............... 48/127.9, 48/197 R, 198.3; 208/79; 422/187, 189, 422/198, 211
See application file for complete search history.

(56) References Cited

U.S. PATENT DOCUMENTS

| | | | |
|---|---|---|---|
| 6,123,913 A | 9/2000 | Clawson et al. | 423/652 |
| 6,227,151 B1 | 5/2001 | Ma | 123/3 |
| 6,793,698 B1 * | 9/2004 | Sanger et al. | 48/127.9 |
| 2004/0006914 A1 * | 1/2004 | Shaaban et al. | 48/197 R |

* cited by examiner

*Primary Examiner*—Glenn Caldarola
*Assistant Examiner*—Prem C. Singh
(74) *Attorney, Agent, or Firm*—Richard E. Backus

(57) ABSTRACT

Apparatus and process for reformulating liquid fuel. In one step of the process the fuel is fractionated into light and heavy fractionates. The light fractionate is then reformed in a steam reformer into a reformed fuel that is suitable for use in fuel cells or other energy-producing devices. The heavy fractionate is burned with a part of the resulting heat used in the reforming step. In one embodiment the light fractionate is desulfurized before entering the reforming step. In another embodiment the heavy fractionate is directed into a holding vessel for subsequent use as a fuel which is suitable for burning to produce heat or other energy.

19 Claims, 14 Drawing Sheets

LIQUID FUEL PREPROCESSOR

GOVERNMENTAL AGENCY RIGHTS

This invention was made with Government support under US AMCAC Natick contracts DAAN02-98-P-8568 and DAAD16-99-C1021 and DARPA contract MDA972-01-C0066. The Government has certain rights.

CROSS-REFERENCE TO PRIOR APPLICATION

This application claims the benefit under 35 USC §119(c) of U.S. provisional application Ser. No. 60/236,956 filed Mar. 5, 2003.

BACKGROUND OF THE INVENTION

1. Field of the Invention

The invention relates in general to the field of reforming fuel for use in fuel cells and other energy-producing systems such as internal combustion engines, auxiliary power units, furnaces, heaters, boilers and fuel upgrading reactors.

2. Description of the Related Art

Fuel Cells are efficient, environmentally friendly and have the potential to be used in many power generation markets. For this potential to be realized, fuel cells need to be fuel flexible, and operate on liquid fuels derived from either petroleum, coal or biomass feedstocks. For example, in the distributed generation market, for remote operation, or as a back up fuel, petroleum distillate (e.g. #1 or #2), as well as liquefied Petroleum Gas (LPG), can be used. In the truck Auxiliary Power Unit (APU) market, the fuel cell needs to work on diesel fuel and in military transport and mobile power applications, the fuel of choice is logistic fuel (e.g. diesel, JP-5 and JP-8). For these applications, distillate fuels need to be reformed and converted to a reformate suitable to fuel cells. For Solid Oxide fuel cells, the suitable reformate is CO and hydrogen and for PEM fuel cells it is pure hydrogen. Since the process for converting CO and hydrogen to pure hydrogen is well established, the main challenge in using distillate fuels in fuel cells is to convert them to CO and hydrogen (i.e. syngas). Reforming distillate fuels to syngas has three major challenges; 1) the fuel has heavy ends that can transform into carbon and gums that can block passages and deposit on surfaces, thereby deactivating reformer and fuel cell elements, 2) the fuel has enough sulfur to poison reforming catalysts and fuel cell reactive elements, resulting in short lifetimes and (3) containments in the fuel, from either them original refining operation or post refining handling, can create deposits that deactivate reformer and fuel cell elements. Because of these challenges, no reliable, effective and efficient reformer has been developed to operate on these fuels.

OBJECTS AND SUMMARY OF THE INVENTION

It is an object of the invention to provide a liquid fuel preprocessor which obviates the limitations and disadvantage of conventional fuel reformulators as described above.

Another object is to provide a liquid fuel preprocessor of the type described which reformulates fuel for use in a fuel cell or other energy-producing device.

Another object is to provide a liquid fuel preprocessor of the type described which reformulates fuel while also produces a heavy fractionate for use in producing heat.

Another object is to provide a liquid fuel preprocessor of the type described which reliably converts distillate fuels to syngas.

DESCRIPTION OF THE PREFERRED EMBODIMENTS

Figure 1:
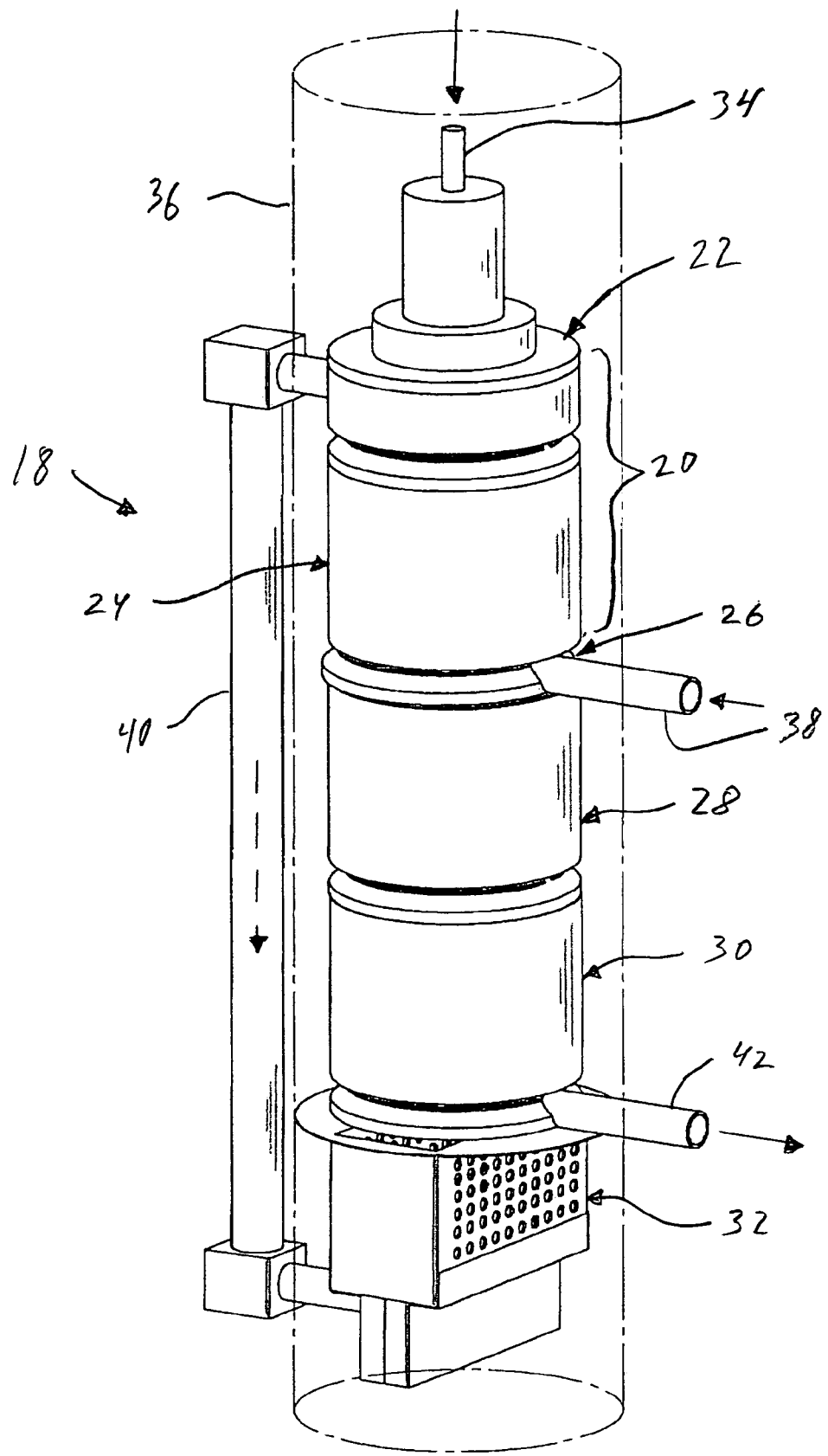
FIG. 1 is a perspective view of apparatus for carrying out the methods of the invention in accordance with one embodiment.

FIG. 1 shows apparatus 18 which carries out the process steps of the invention in accordance with one preferred embodiment. The principal components of apparatus 20 are vertically stacked and connected in series along the flow stream. They comprise: a fuel preprocessor 20 (FPP) which in turn comprises a fuel fractionator 22 and optional desufurizer 24, a mixing chamber 26, a prereformer 28, a reformer 30, and a burner 32.

Fuel fractionator 22 receives liquid distillate fuel from a supply source, not shown, through an inlet 34. The inlet can be fitted at the top end of a suitable outer housing, shown by the phantom lines 36. Steam is directed into the prereformer through an inlet 38.

Initially the fuel is preprocessed in the fractionator with or without the optional desulfurization step. As the fuel enters the fractionator it is heated and separated by boiling into light ("light ends") and heavy ("heavy ends") fractions. The entering fuel is either pumped or gravity fed, provided that the fuel source is properly positioned to create a low pressure fuel supply required for the system. As the fuel flows through the fractionator, light fuel fractions evaporate and the remaining heavy ends liquid flows down through conduit 40 into the burner at the bottom of the apparatus. Processed fuel leaves reformer 30 and is directed out of the apparatus through an outlet 42 to the desired end use, such as a fuel cell.

The multi-step process of the invention reduces the risk of reforming the distillate fuels. The fractionator temperature is set for optimal efficiency as well as the desired fractionation needed for: a) the reforming step and b) providing process heat. The heat to drive the fractionator is supplied by hot gases flowing around the fractionator. Alternatively, the hot fractionator can be augmented by a partial vacuum or even replaced by a membrane to separate the heavy and light ends. In either case, the outcome is to separate light and heavy fractions, which then are used to support the reforming and process heat needs.

Figure 2:
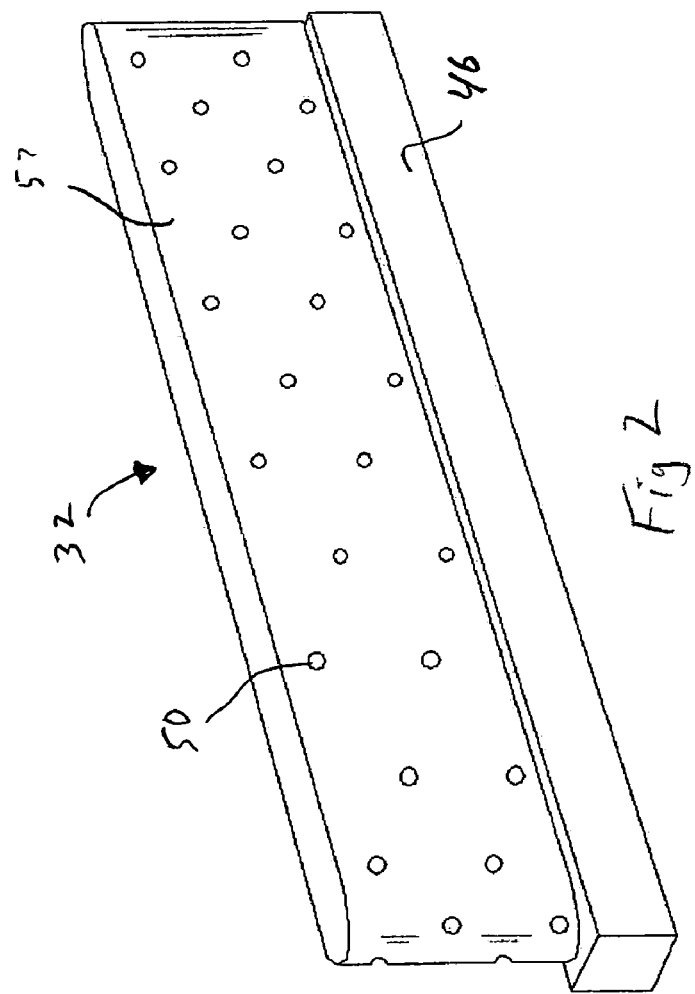
FIG. 2 is a perspective view of the burner which is a component of the apparatus of FIG. 1.

FIG. 2 illustrates burner 32. Burning of the heavy ends in the burner produces heat for the reforming and fractionation steps, as needed. For large scale uses, (>1 Kwe fuel cell applications) conventional oil burners can handle this type of fuel. However, for smaller applications (<500 We), the heavy ends will plug the narrow passages of a conventional burner. For this purpose burner 32 is of the type that comprises a plurality of porous surface elements (PSE) 44, of which one unit 45 is shown in FIGS. 13 and 14.

Figure 3:
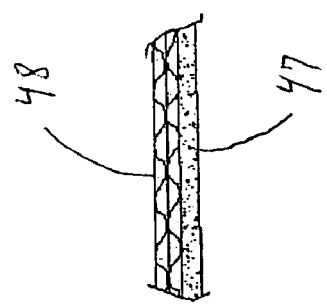
FIG. 3 is a cross section view taken along the line 3-3 of FIG. 14.

Burner 32 is supplied with liquid fuel from a reservoir in its base 46. A flame-holding perforated screen 52 having spaced-apart walls is mounted above the base. A plurality of perforations 50 are formed in the walls. The burner further comprises a PSE unit 45 which is best shown in FIGS. 13 and 14. The PSE draws fuel from the reservoir to the upper heated end by capillary action through an outer light-off wick 47 (FIG. 3) which has its lower end immersed in the fuel. Fitted inside the wick is a ceramic fabric mesh 48 that is formed with a multiplicity of different size passages (FIG. 3). The fabric mesh is U-shaped with a metal mesh spacer 49 mounted between the two sides of the mesh 48 (FIGS. 13 an 14). The fuel is vaporized by radiant heat feedback from the flame, and then mixed with incoming air supplied by a fan, not shown. The air-vaporized fuel mixture flows out through perforations 50 and burns in a flame. The flame is initiated downstream of the PSE and is stabilized by screen 52, which controls flame temperature and soot formation.

Figure 13:
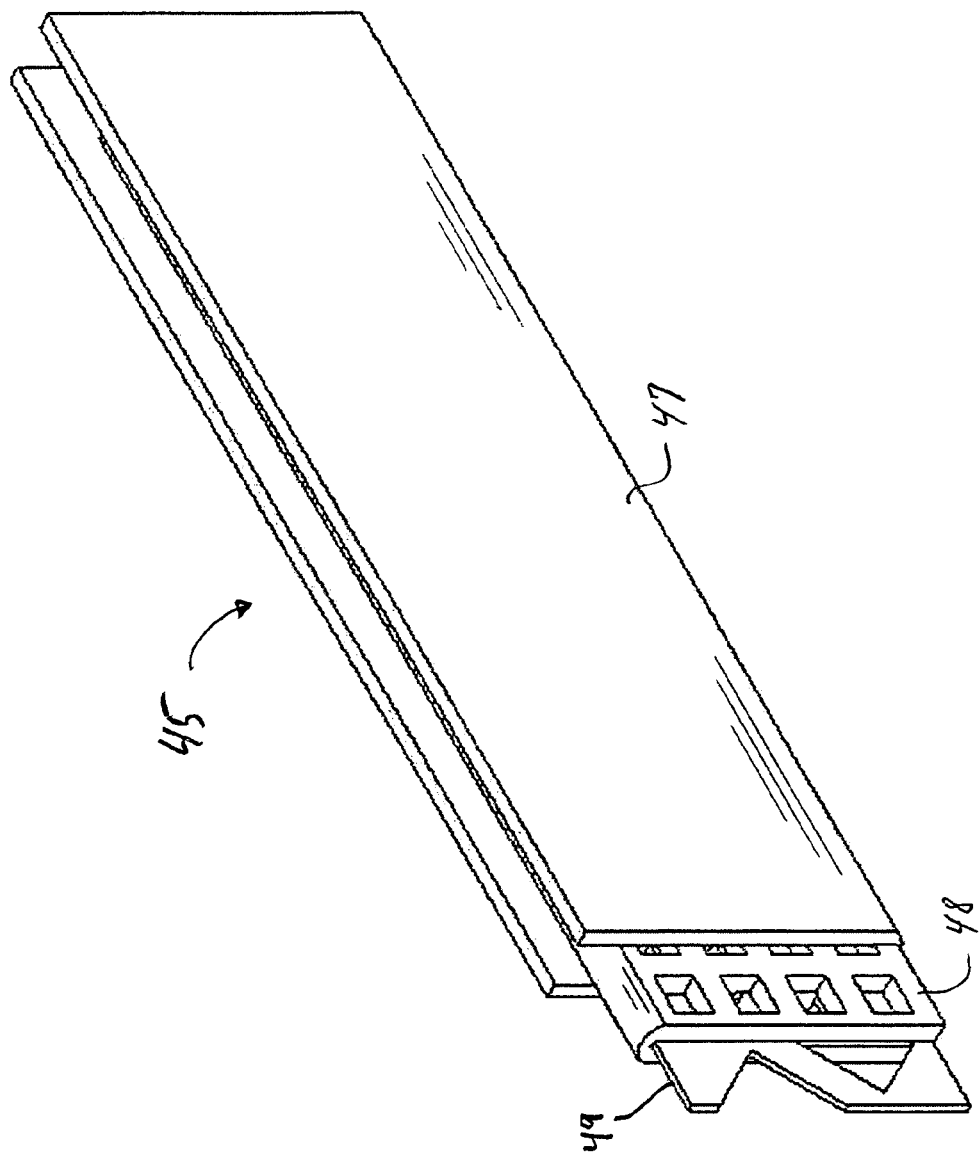
FIG. 13 is a perspective view of the porous surface element shown in FIG. 2 illustrating details of its construction.
Figure 14:
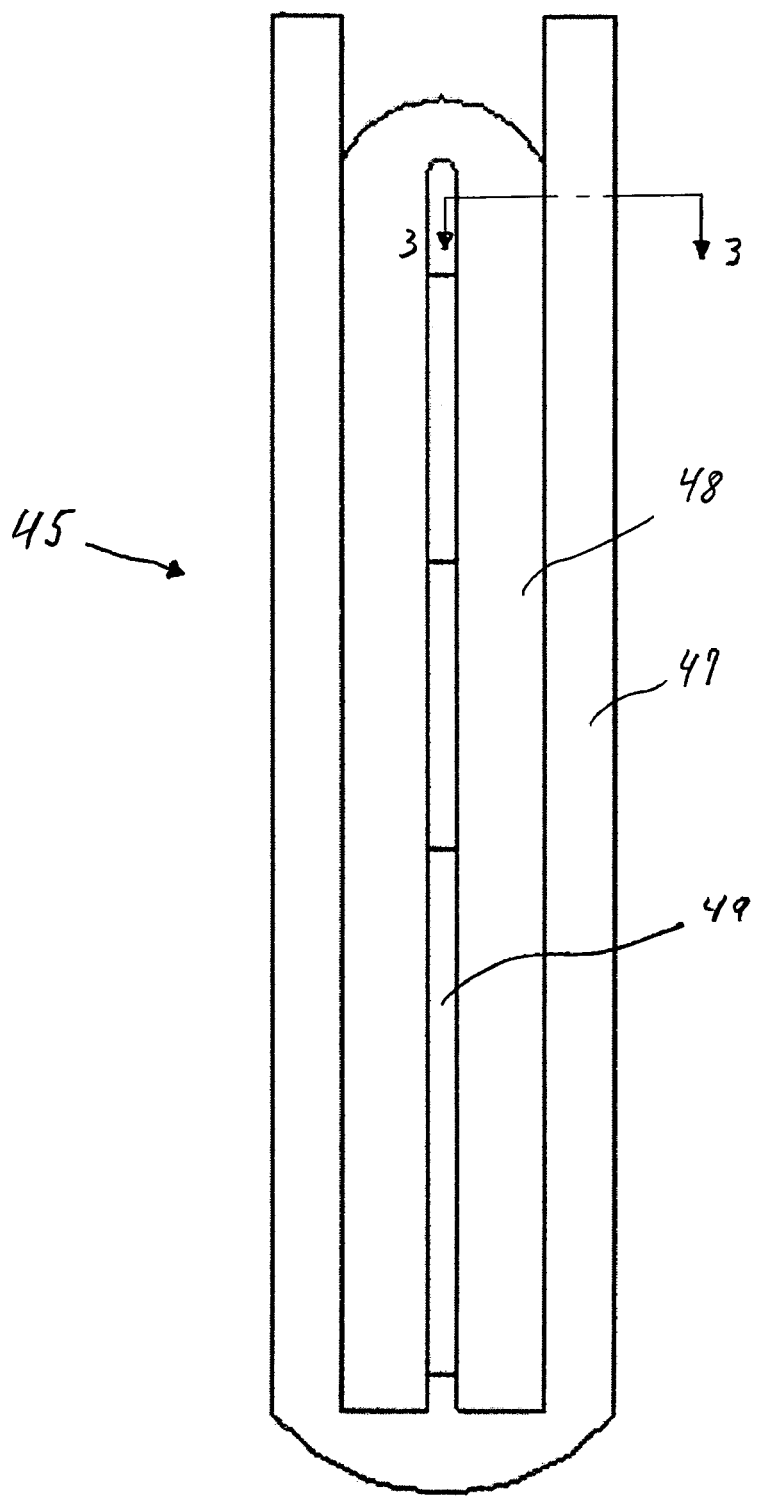
FIG. 14 is schematic end view to an enlarged scale of the porous surface element of FIG. 12.

FIGS. 2, 13 and 14, show details of the PSE unit. One or multiple folded layers of the ceramic mesh fabric 48, comprised of approximately 1 mm thick elements spaced more than 1.0 mm (0.040 in), is sandwiched between another outer layer 47 of folded fabric. The mesh elements produce multiple sized, rather large (>1 mm) channels and passages for vaporization. These inner meshed layers are recessed below the tip of the outer layer and protected from the flame. In addition to protecting the inner layer, the raised outer layer provides a "light off" wick. To have a rapid startup, the outer layer is chosen from thin ceramic papers. To stiffen the wick and to be able to insert it into the reservoir wick channel, a strip of metal mesh is used as a central core, or spine, of the wick. This metal spine also conducts the heat deep down into the wick to provide additional vaporizing sites deep inside the PSE wick.

The wick 47 of each PSE has the functions of capillary pumping of fuel to the wick end and receiving heat from the flame to vaporize the liquid fuel. In conventional high pressure feed burners such as camping stoves, these functions require many components that add to the system weight. Furthermore, conventional burner components typically are of machined parts having small passages that can tend to plug with residues from JP8 and like distillate fuels. Furthermore conventional wick-based burners plug and become ineffective on these fuels within only a few hours. This is avoided with the use of porous surface elements 44 of the burner through the described special features of the wick.

Screen 52 positioned about the PSE wick has multiple functions. It holds the flame, distributes the air and also cools the flame sufficiently to produce a non-sooting and blue flame. The typical yellow, luminous nature of an oil or gas fired diffusion flame is caused by the formation of soot particles within the interior of the flame envelope, and the burning of these particles in and downstream of the flame. When the temperatures in this fuel rich core are high, and the residence times sufficient, the hydrocarbons pyrolyze, generating carbon soot particles that produce a luminous flame. By extracting heat from the flame with the screen, in this invention, the soot formation is suppressed and a clean burning blue flame is produced. To achieve this, the screen gap tight enough to extract the heat needed to suppress the soot formation, but not that tight to touch and suppress the flame locally and produce smoke. Depending on the scale of the burner, a gap between 0.2 to 0.35 inches was found to be optimal.

The light fraction of fuel which exits from the fractionator has less sulfur and less contaminants, as a result of the fractionation step. It then enters desulfurizer 24 where residual sulfur is removed, if needed. The desulfurizer can be comprised of an organic sulfur trap (OST), hydrodesulfurizer or other suitable sulfur removal means. In the OST method, sulfur-capturing material such as those described in patent application Ser. No. 10/365,574 can be used to capture the residual light ends sulfur compounds.

Fuel exiting the desulfurizer, that is now sulfur free, enters mixing chamber 26 located between the desulfurizer and pre-reformer. Steam is added to this chamber through inlet 38. The fuel and steam mix and enter the pre-reformer, where the fuel light ends are broken down into CO, hydrogen and some low carbon number hydrocarbons, such as methane. The pre-reformer comprises Ru and Rh or other precious metal catalysts supported on zirconia, ceria or other supports. The pre-reformer will operate at <600° C. where the light fractions are broken down to lighter hydrocarbons, $H_2$ and CO. By operating at such low temperatures, the risk of carbon deposition in the reformer and/or fuel cell is minimized.

The pre-reformed gases, now upgraded to CO, hydrogen and a low carbon number hydrocarbon mixture, enter the final reformer 30 to complete the steam reforming at a temperature >700° C. By breaking the reforming into lower temperature prereforming and higher temperature reforming steps, the carbon deposition risk is further reduced. The reformate, comprised principally of CO and hydrogen, exits from outlet 42. This reformate is suitable for use in a solid oxide fuel cell.

Figure 4:
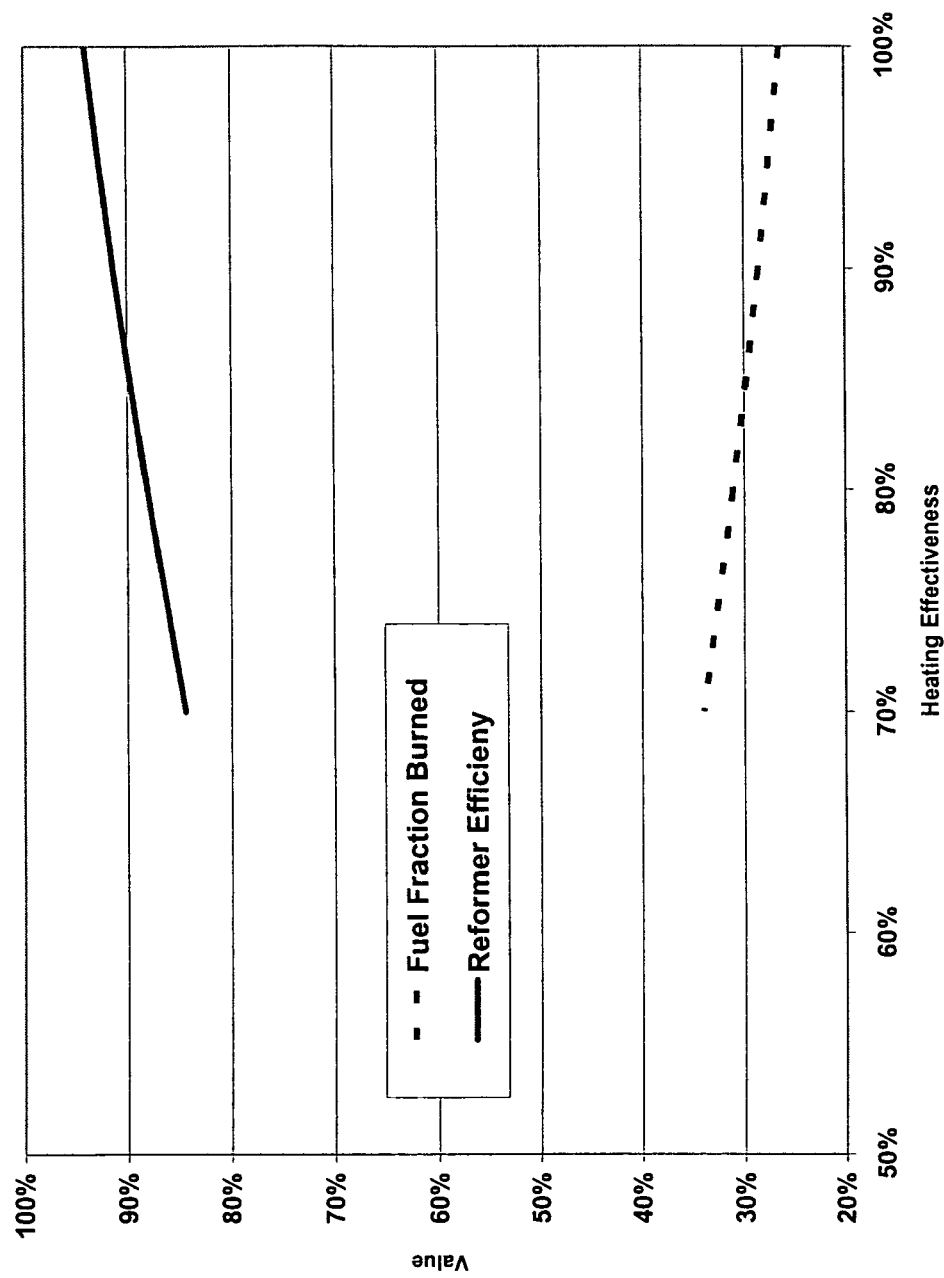
FIG. 4 is a graph showing the fuel conversion efficiency for the methods carried out by the apparatus of FIG. 1.

The fuel conversion as well as carbon deposition benefits of this invention are highlighted by system calculations and tests. The graph of FIG. 4 shows a calculated plot of fuel conversion efficiency resulting from the process of this invention. The efficiency is plotted as a function of heating effectiveness, which is the ratio of heat into the process versus the energy of the fuel that is burned. The heating effectiveness is reduced by the sum of the burner exhaust loss and the system shell heat loss. The reformer efficiency is defined as the lower heating value (LHV) of the product gases divided by the LHV of the fuel used. This plot also shows the fraction of the fuel that is burned for process heat. At 100% heating effectiveness, the system is 93% efficient. This value is reduced as heating effectiveness decreases. At the practical 70%-80% heating effectiveness, the reformer efficiency is 85%-90%, and 30%-35% of the fuel is burned, leaving 70-65% to be reformed.

Figure 5:
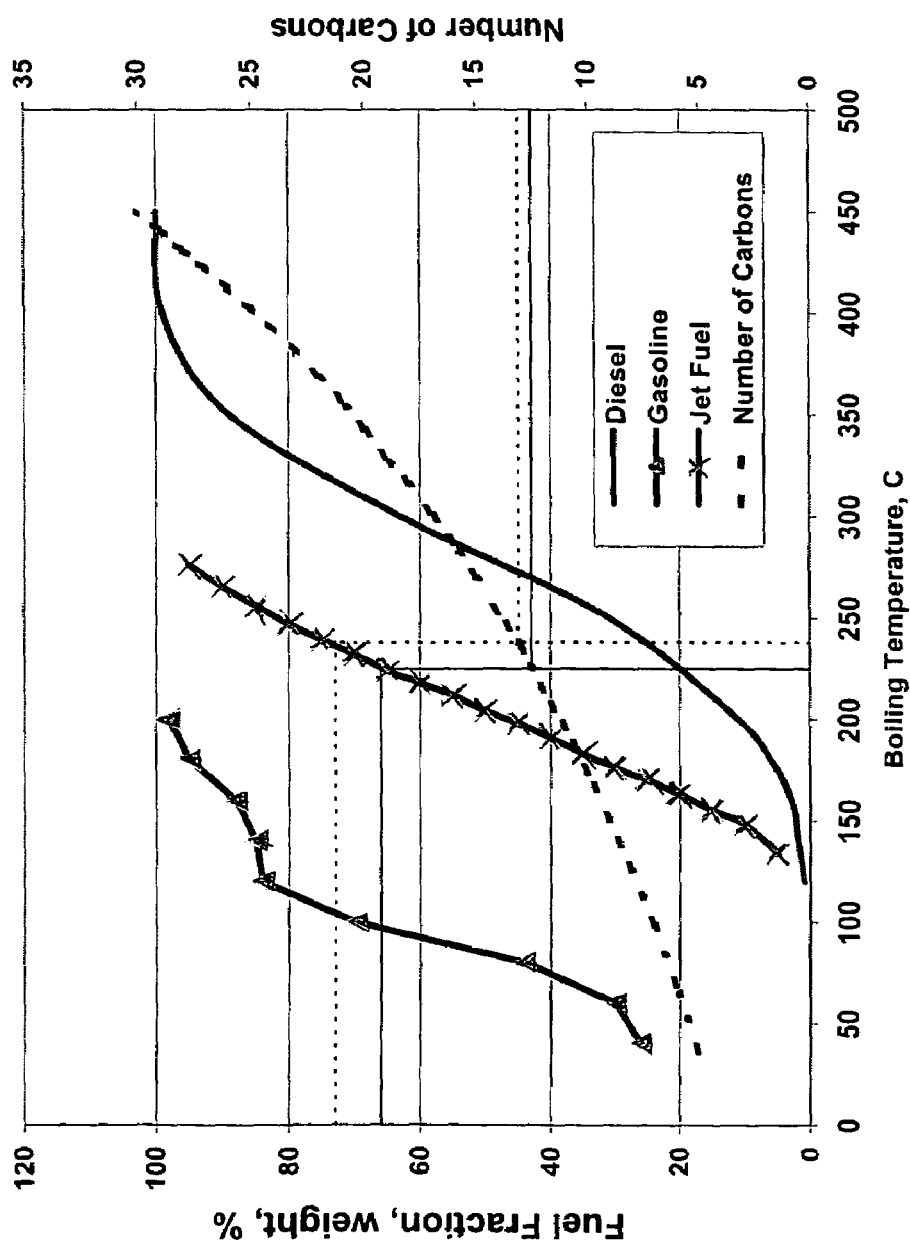
FIG. 5 is a chart showing distillation curves for certain fuels that can be preprocessed by the apparatus of FIG. 1.
Figure 6:
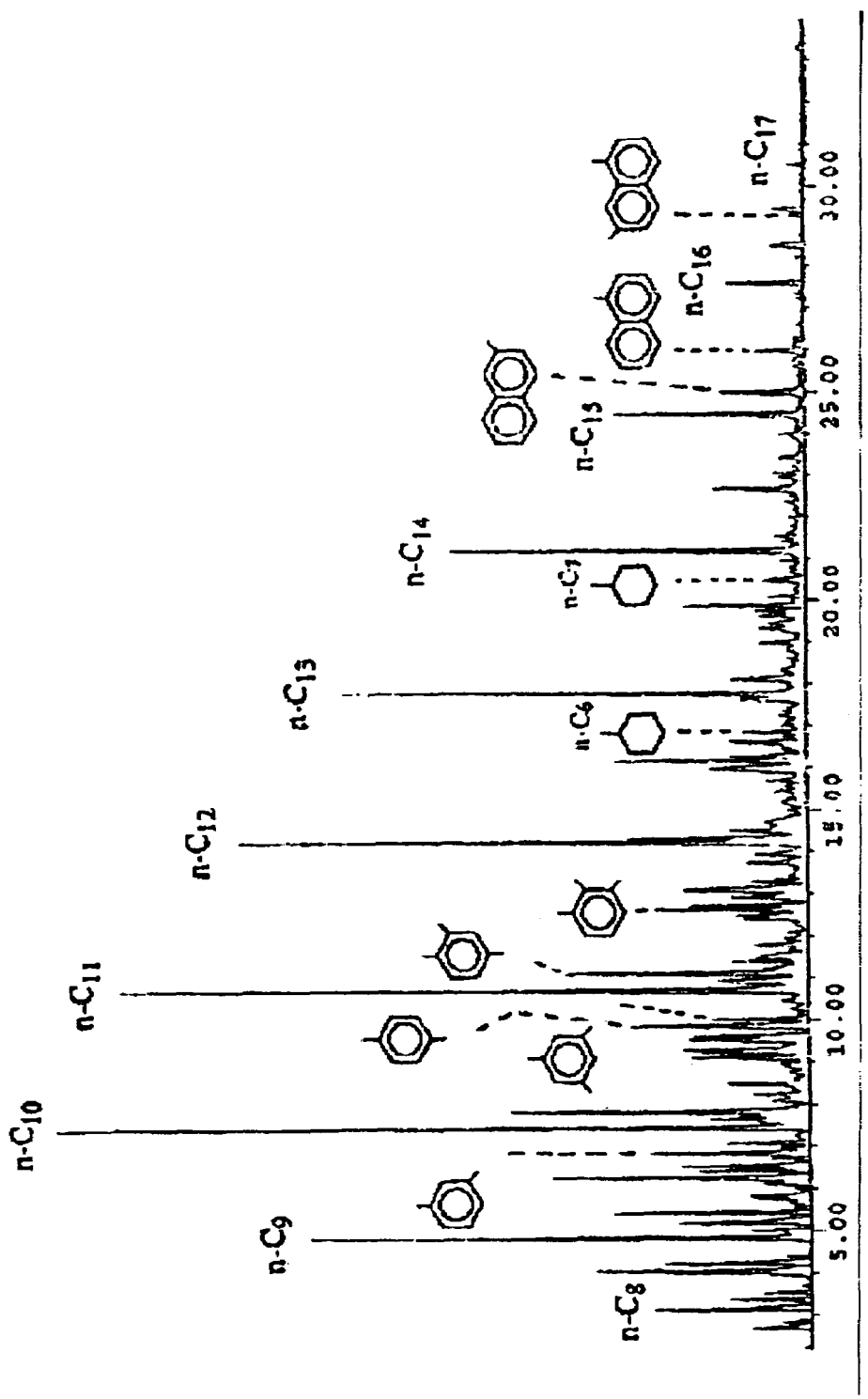
FIG. 6 is a chart showing the fuel structure of one of the fuels in the chart of FIG. 5.

The graph of FIG. 5 shows the distillation curves for diesel, JP-8 and gasoline. Referring to the JP-8 curve of this figure, the 65% of the fuel contains lighter than C12 molecules. Examining the components of a JP-8 fuel structure, such as that shown in FIG. 6, shows that by removing the carbon chains heavier than C14, the fuel two ring aromatics that contribute substantially to the carbon formation are removed. This is also supported by the test results discussed below. FIG. 5 also shows that the light JP-8 ends have a boiling point close to 200° C., which is the final boiling point of gasoline. Thus by using the fractionator of the invention and removing the heavy ends to be burned, the light fuel is a gasoline-like fuel that has less potential for carbon deposition during reforming (as shown by test results in the available literature).

Examples of Liquid Fuel Preprocessor and Reformer Applications

Apparatus 18 of FIG. 1 comprises a vertically stacked arrangement that is most suitable for a reformer to supply the needed reformate to a 20 watts solid oxide fuel cell. For this application, the best desulfurizer step is a replaceable cartridge type sulfur compound adsorbent, and the burner is that disclosed in FIGS. 2 and 3. The invention is flexible and can be used at larger scales and its components can be arranged differently. For example, for larger scales (>1 kWe fuel cell), the desulfurizer can be a hydrodesulfurizer or a two-module adsorbent, where one module adsorbs the sulfur and the other module is regenerated in a cyclic mode.

Figure 7:
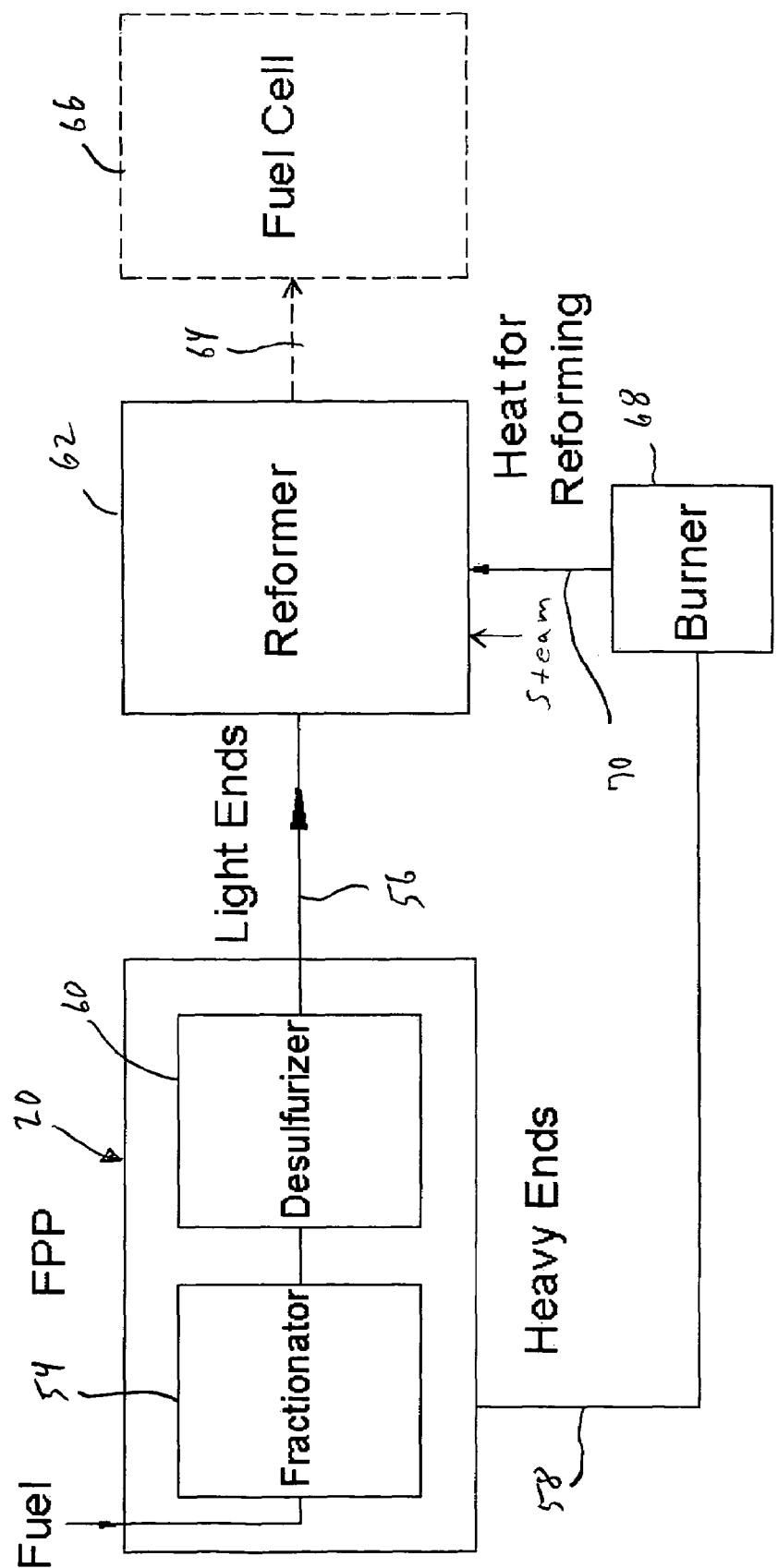
FIG. 7 is a block diagram showing the broad process steps of the invention.

The block diagram of FIG. 7 shows the broad process steps of the invention for the apparatus and methods described in connection with FIG. 1 as well as other fuel preprocessing applications. Fuel preprocessor 20 fractionates input fuel at step 54 into fractionates comprising a light ends stream at step 56 and a heavy ends stream at step. The light ends can be desulfurized by a desulfurizer as an optional step 60. The light ends with little or no sulfur and contaminants are then reformed by reformer 30 at step 62 into CO and hydrogen. The hydrogen is directed at step 64 into the desired end use application, such as the illustrated fuel cell 66. The heavy ends are burned by burner 32 at step 68 to produce heat. That heat is directed at step 70 for use in the reformer process.

Fuel preprocessor 20 as a principal component of the invention and can be applied differently to address various applications. In the FPP, the fuel is separated into at least two streams of heavy and light fractions. This is achieved by boiling point fractionation, vacuum fractionation or distillation, filtration, membrane separation, adsorption or any combination of these methods. The FPP step is critical in that it separates out the problematic heavy ends, inorganic contaminants and a majority of the sulfur in liquid (e.g. petroleum distillate) fuels. If additional sulfur reduction is required, the desulfurizer is included. The desulfurization step can be performed by adsorption, hydrodesulfurization or other means. By removing the hard-to-remove sulfur compounds in the fractionation step of the FPP, the load on the desulfurizer portion of FPP is reduced substantially. This is a major advantage of placing the fractionator in front of the desulfurizer, and this conclusion is supported by test results discussed in connection with FIG. 10. The fuel exiting the FPP has low sulfur and low carbon deposit forming hydrocarbon compounds that can then be reformed more easily to hydrogen or hydrogen/CO. The problematic heavy ends are transported out of the FPP and burned to produce heat required for the reforming step.

Figure 8:
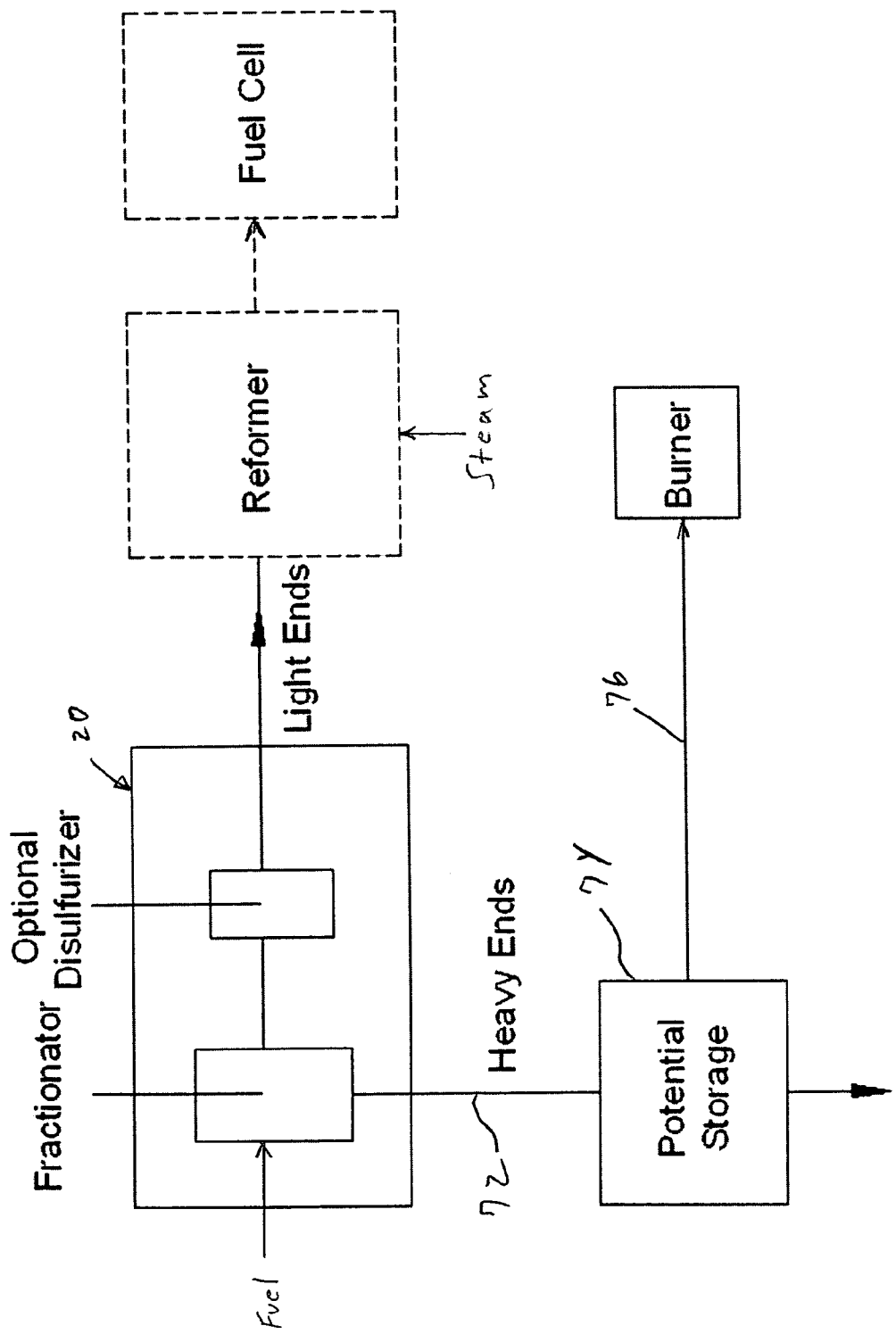
FIG. 8 is a block diagram showing the principal steps in a process according to another embodiment.

In FIG. 8 the block diagram shows another embodiment providing a process in which heavy ends separated in FPP 20 at step 72 are sent to storage at step 74. A portion of the heavy ends can be directed at step 76 into burner 68. In regard to the fully integrated preprocessing and reforming system shown in FIG. 1, the heat used in the process defines the amount of the light ends fraction, and limits the heavy ends fraction to 30%-35%. However, in certain fuel cell applications, the fuel cell would be an auxiliary power system that is adjacent to large propulsion engines, which are the primary consumers of fuel. For example, a diesel driven vehicle (e.g. truck) would be in this category, as well as a ship, locomotive, etc. In the process of FIG. 8 the heavy ends separated by the process are sent to storage at step 74 and, either simultaneously or at a later time, can be used in other adjacent power applications, such as in a prime mover for propulsion. One example of such an application is a truck auxiliary power unit (APU).

Currently trucks consume over 800 million gallons of diesel fuel per year while idling to produce auxiliary power for personnel or refrigeration. If instead fuel cell based APUs were used, over 600 million gallons of fuel per year would be saved. This is a substantial saving. However, diesel fuel is a challenging fuel to use in fuel cells because it has heavy ends and sulfur compounds, which block, poison and deactivate fuel reformer and fuel cell reactor elements. The FPP can be applied to preprocess the fuel to make it suitable for the fuel cell based APU.

Figure 9:
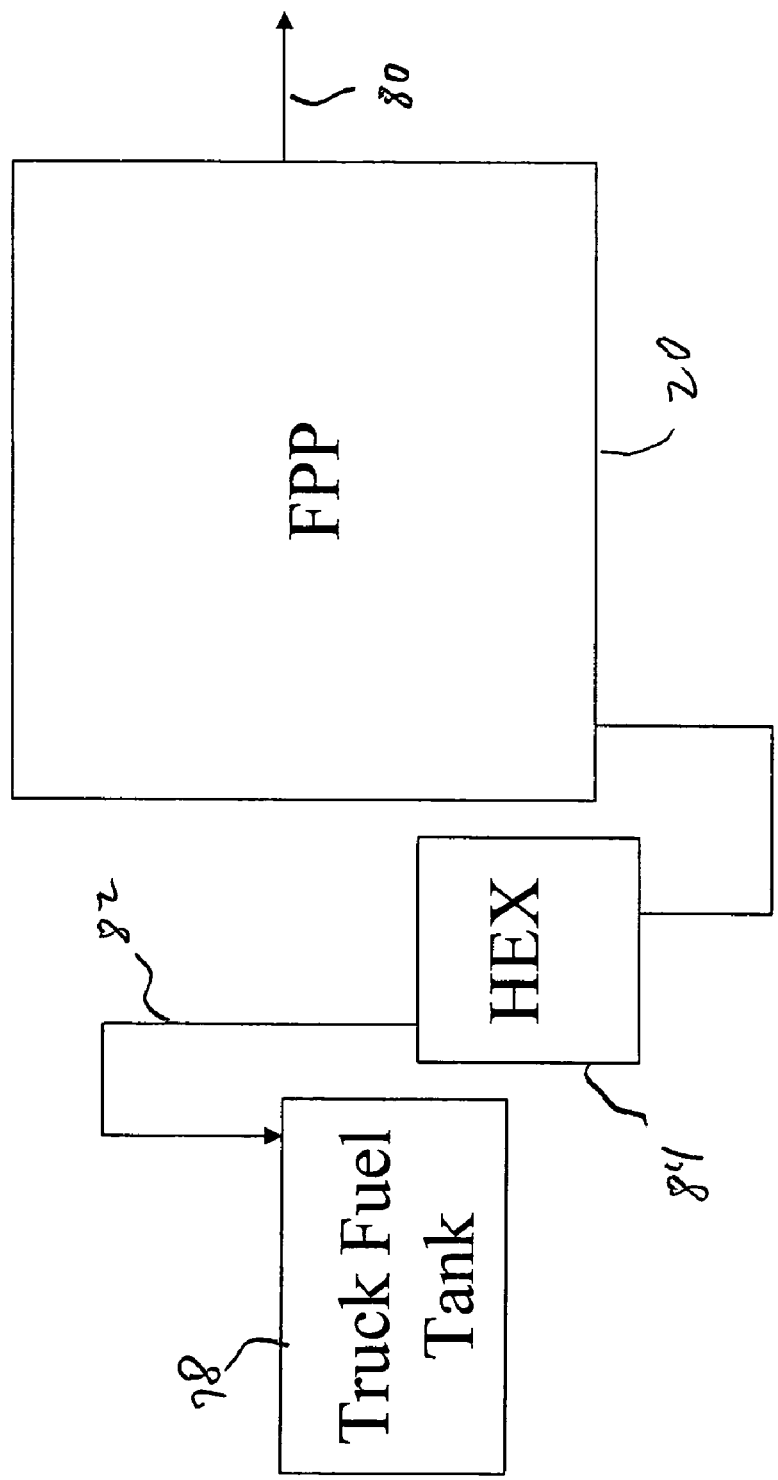
FIG. 9 is a block diagram showing the steps in preprocessing a portion of fuel from a vehicle fuel tank into a fractionate suitable for use in a fuel cell.

An example of an application employing the process of FIG. 9 is where a small amount of diesel fuel is drawn from a truck fuel tank 78 and preprocessed in FPP 20. The clean fuel is then directed at step 80 to the reformer (not shown) for use in a fuel cell. The heavy ends portion of the fuel is returned to the truck's fuel tank at step 82 where it is diluted by the remaining fuel and used in the truck's diesel engine. Before mixing with the diesel fuel, the heavy ends stream is cooled down by a heat exchanger at step 84. This step is both for purposes of safety to prevent ignition within the fuel tank, and for heat recovery. Since in this application the heavy ends are used in the main truck engine, then the amount of light and heavy ends generated is no longer restricted to 70% light and 30% heavy ends. For example the fuel can be fractionated to 20% light ends and 80% heavy ends. By removing more of the heavy ends, a very light gasoline-like fuel with substantial reductions in carbon forming polyaromatics and fuel sulfur is achieved in the fractionation step of the FPP. By converting the diesel fuel to a gasoline-like fuel on board the truck, a fuel cell APU system developed for gasoline fuel can be utilized without concern for degradation.

A similar approach can be used on military vehicles or fueling stations, where the FPP cleans the fuel for separate fuel cell system applications, and returns the heavy ends to the vehicle fuel tank or to fueling station reservoir to be used for conventional engines and like applications. Another example is producing combined heat and power. In this application, the heavy ends are burned to produce heat or hot water for residential and other applications, and the light ends is consumed to produce power in a fuel cell.

Benefits of the FPP

An example showing the potential of the FPP for the integrated preprocessor and reformer embodiment of FIG. 1, diesel and JP-8 fuels are fractionated into 30% light ends and 70% heavy ends. This is for an integrated FPP and fuel cell application, where the heavy ends are consumed to produce heat for reforming. Test results for diesel and JP-8 fuels are shown in Tables 1 and 2, respectively. The tables show that by just removing 30% of the fuel heavy ends approximately 50% of the sulfur and 42% of the polyaromatics in the fuel are removed. As a result the clean fuel has a substantial reduction in carbon formation tendency, as shown by the ASTM 4530 carbon residue results.

TABLE 1

Effect of removing 30% heavy ends from diesel fuel by fractionation

|  | Parent fuel | Clean fuel | Percent Reduction |
| --- | --- | --- | --- |
| Sulfur, ppm (ASTM 2622) | 163 | 77 | 53% |
| Poly aromatic, % (ASTM 5286) | 1.9 | 1.1 | 42% |
| Carbon residue, % (ASTM 4530) | 0.05 | 0.016 | 68% |

TABLE 2

Effect of removing 30% heavy ends from JP-8 fuel by fractionation

|  | Parent fuel | Clean fuel | Percent Reduction |
| --- | --- | --- | --- |
| Sulfur, ppm (ASTM 2622) | 736 | 371 | 50% |
| Poly aromatic, % (ASTM 5286) | 2.55 | 1.4 | 45% |
| Carbon residue, % (ASTM 4530) | 0.008 | <0.001 | >85% |

The FPP additional desulfurization step can be by adsorption methods. An example of desulfurization by adsorption is the organic sulfur trap apparatus, invented at Pennsylvania State University (PSU). The amount of adsorbent used in any desulfurization depends on the amount of the fuel, its sulfur level and the type of sulfur compounds. Tests at PSU have shown that it is more difficult to adsorb the heavier sulfur compounds. This is also the case with hydrodesulfurization and any other type of desulfurization. Tests show that the FPP fractionation step not only removes half of the fuel sulfur, but also removes the heavier and the more difficult to remove sulfur compounds. As a result, the load on the desulfurization step of the FPP is reduced.

Figure 10:
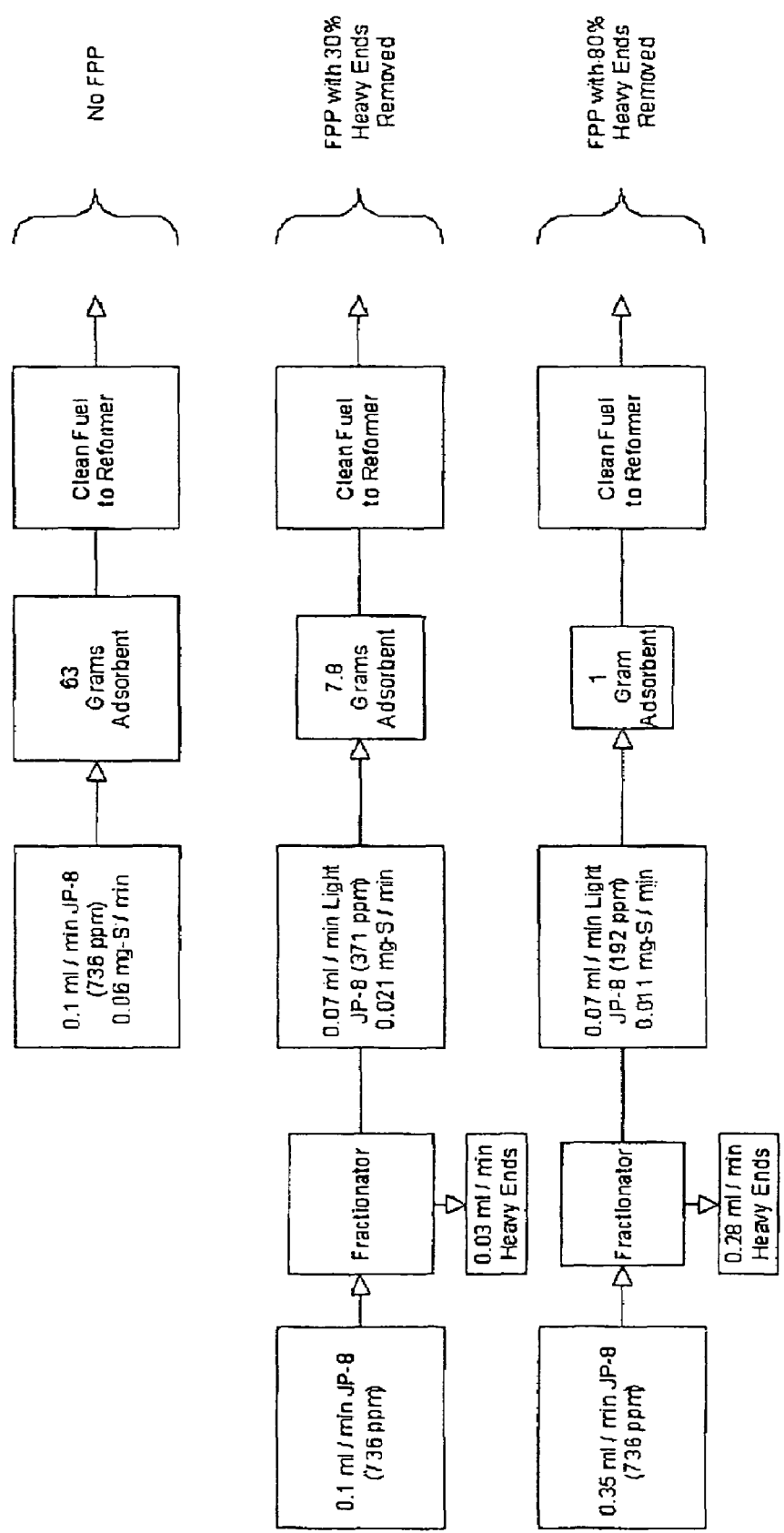
FIG. 10 is a flow chart showing the results of desulfurization tests on one liquid fuel.

The flow chart of FIG. 10 shows desulfurization tests on JP-8 and FPP fractionated JP-8, as listed in Table 2. Both sulfur removal of the parent fuel and light fractions were tested using the same PSU desulfurization adsorbent. Results showed that the light fraction produced by the FPP required 8 times less adsorbent than the parent fuel. These data are for a reformer for a 20 watts solid oxide fuel cell that is operated for 72 hours. If the fractionator is not used, 63 grams adsorbent is needed. This doubles the weight of the reformer, and makes the system too heavy and too expensive to be practical as a battery replacement. However, if the fractionator is utilized ahead of the desulfurizer, only 7.8 grams, or 8 times less adsorbent, is required. This is because by removing the hard-to-remove sulfur compounds, the fractionator portion of the FPP has a nonlinear multiplying effect on improving the adsorbent capacity, defined as mg sulfur per gram of adsorbent captured. Therefore, although 30% of the light ends were separated and only 50% of the sulfur was removed, eight times less adsorbent is required. Tests with 80% of the heavy ends removed and 20% light ends reformed, show that adsorbent needed is less than 1 grams. This demonstrates the effectiveness of the FPP in reducing the size and the cost of the fuels desulfurization step.

Burner and Vaporizer Embodiments

As discussed above for the integrated application, the heavy ends need to be burned in a burner to produce the heat needed for the reforming step. Burning distillate fuels, especially the heavy ends, is difficult in burners smaller than <5000 w thermal. For example camping stoves (with 3000 watts thermal capacity) can burn white gas, but their orifices plug in less than 20 hours when burning JP-8, diesel or other like distillate fuels. Therefore, for smaller applications that require <5000 watts thermal, a burner that can reliably burn JP-8, diesel and their heavy ends does not exist. The burner invention shown in FIG. 2 is capable of effectively and reliably working on diesel, JP-8 and their heavy ends.

Figure 12:
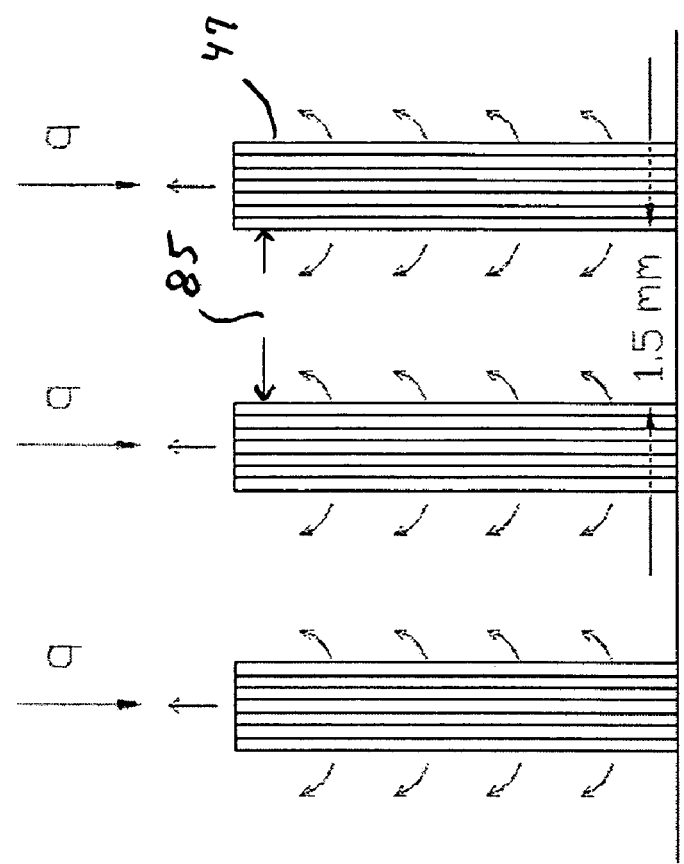
FIG. 12 is a schematic side view of a pair of the porous surface elements of FIG. 2 illustrating the effect of spacing between the elements when in use.

FIG. 12 shows details the side-by-side placement of three wicks 47 of which the porous surface element is comprised. The wick is configured with multiple vertically aligned passages 85 that have a range of widths. The wick elements are positioned such that the passages are wide enough to avoid blocking the PSE paths due to carbon deposits over time as a result of exposure to the flame. This occurs particularly during shutdown when the flame approaches the surface. However, the recessed surfaces, where most of the vaporization occurs during steady operation, are isolated from high heat fluxes and operate at lower temperature and with much less carbon deposit formation. In addition, passage widths are graded in the PSE wick so that as one class of passages becomes restricted, larger passages take over.

Figure 11:
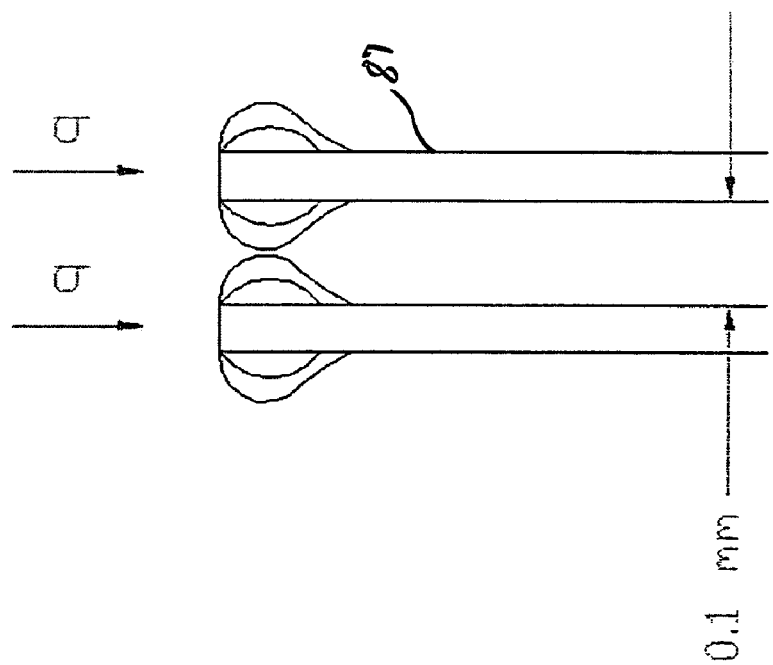
FIG. 11 is a side elevation view of a pair of prior art wicks shown in use together.

FIGS. 11 and 12 show the effect of interwick spacing between prior art wicks 87 and three PSE elements which are mounted in parallel. FIG. 11 shows the side-by-side mounting of a pair of prior art wicks. In these wicks the internal passages are tight. The letters "q" indicate the direction of heat coming back from the flame. At the tip of the wicks where it is the hottest and most of the carbon is deposited, the passages are blocked making the wick ineffective. However, as shown in FIG. 12, with the PSE elements the interwick spacing is wide enough that the tips are not blocked with some inevitable carbon deposits. Also the deep and multiple size passages designed in the PSE (not shown) allows the PSE inner surfaces to work at cooler temperature and less carbon deposit tendency. With this approach, and choosing the appropriate material for the PSE, the burner provides consistent heat output over the long term.

Burner 32 of FIGS. 2 and 3 can be scaled into a 10 watt thermal version for use in the reformer discussed above. The range of the burner is increased to 58 watts by placing a blaster plate, or flame impinger plate, above the burner screen. The burner can be consistently operated for over 300 hours on heavy JP-8 ends exiting the fractionator. The chart of FIG. 14 shows that the products of combustion (POC) temperatures as a function of operating time are acceptable. This burner operates for more than 500 hours with no degradation in output. In addition, the CO and hydrocarbon emissions from the burner meet existing oil burner emission standards.

Figure 15:
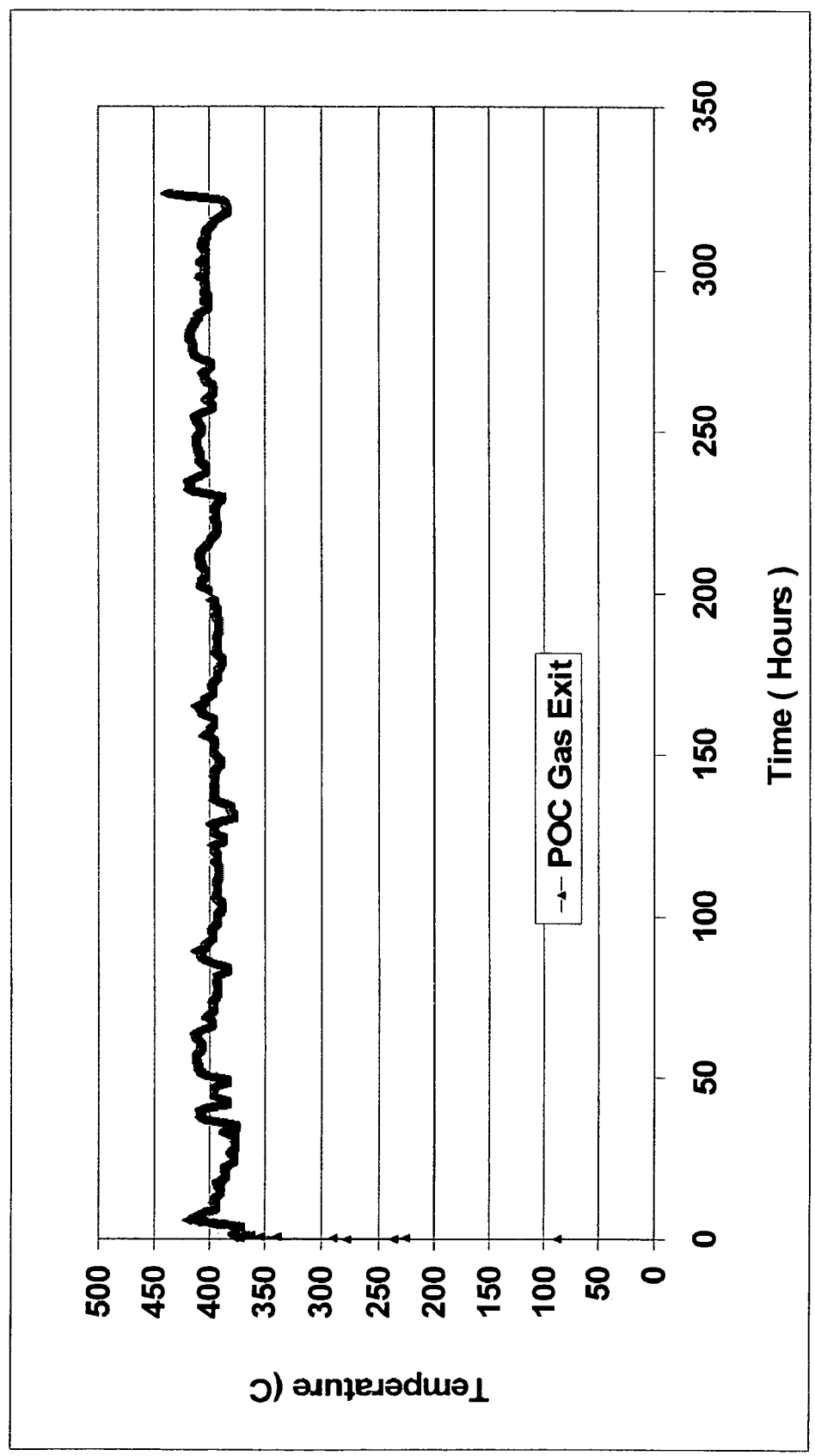
FIG. 15 is a chart showing the products of combustion temperature as a function of operating time for another embodiment of the burner of FIG. 2.
Figure 16:
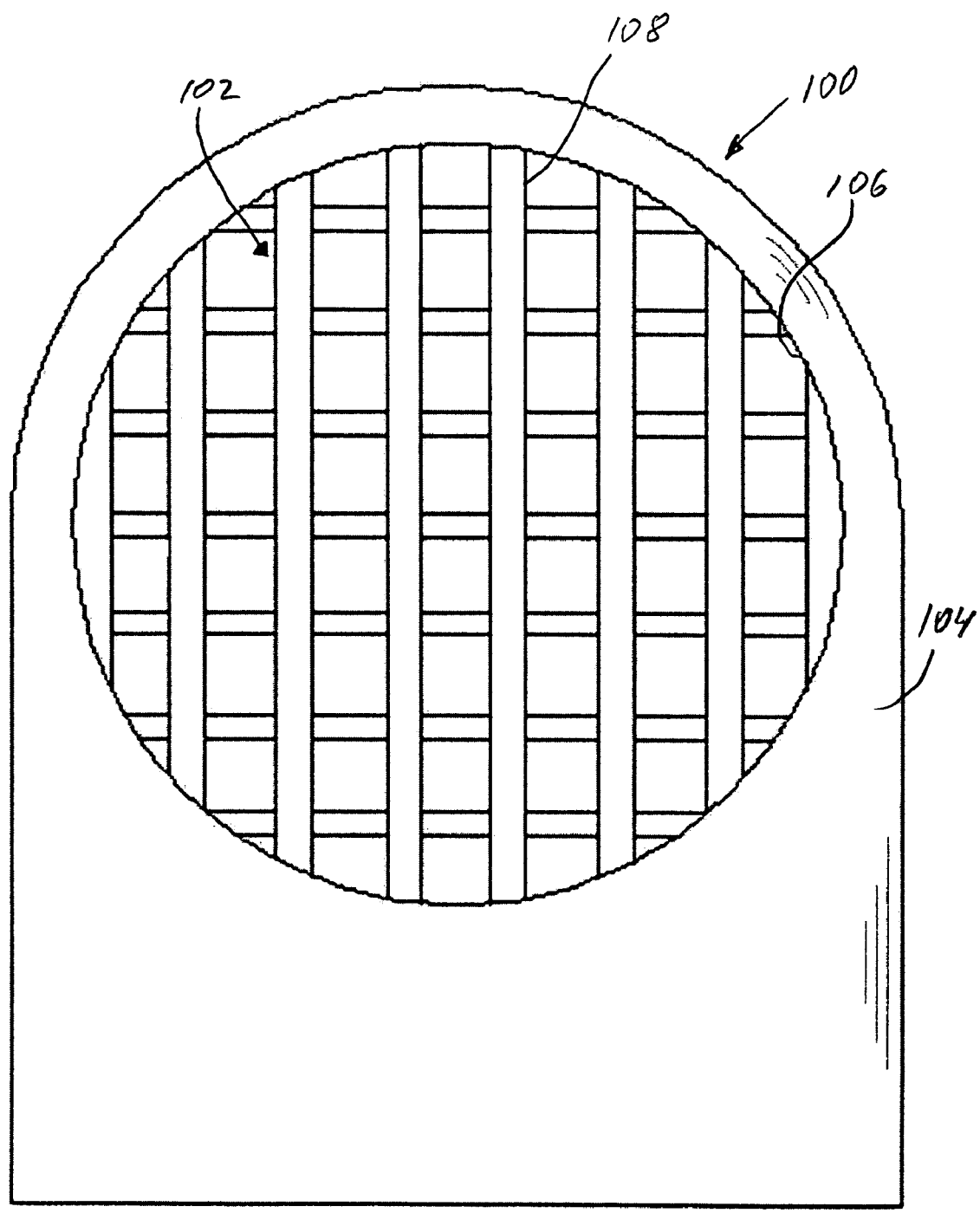
FIG. 16 is a schematic view of a vaporizer to be combined with a porous surface element as in FIG. 13 for use with an engine.

FIG. 15 is a schematic shows a vaporizer 100 incorporating a porous surface element 102 (FIGS. 12 and 13) for use with an engine. The vaporizer comprises a support 104 having a circular opening 106 in which a wick 108 is mounted. The wick can be formed of a suitable fabric having threads which form a reticulated grid of apertures in the manner of a screen. The PSE element with the vaporizer is used to vaporize liquid fuels with combustion air and mix the fuel into a flow steam for reformer applications. It can also be used in small engine applications which require a premixed, or partially premixed, fuel/air mixture. For vaporization purposes, the outer "lightoff wick" is not necessary and is not used. In this case, the engine waste heat is conducted to the PSE to support fuel vaporization. The screens surrounding the PSE would be replaced by a channel which directs the needed engine combustion air over the PSE to entrain and mix with the vaporized fuel. As desired, the combustion air could be preheated with waste heat from the engine. This preheating can help facilitate PSE heating and fuel vaporization.

As in the combustion case, the graded passage sizes of the PSE would minimize passage blocking with carbon or contaminants, resulting in long-term and reliable operation. The vaporization rate of the PSE is modulated by the rate of heat conduction into the PSE, or by the temperature of the combustion air. Through variation of PSE heating and air flow control, fuel/air ratios for optimal engine operation can be achieved. Tests using electric resistance heating of the PSE have shown good vaporization of JP-8 fuel and mixing with unheated combustion air.

Other FPP Applications

The fuel challenges for fuel cells highlighted above also carry over to diesel and gas turbine engines and boilers that employ catalytically active post combustion pollution control techniques, such as Selective Catalytic Reduction (SCR) and lean gas catalytic reactors for diesel engine NOx control. As in fuel cell systems, these catalytically active reactors can be poisoned by carbon deposits, sulfur compounds or inorganic containments in the fuel, resulting in shortened lifetimes and high maintenance costs. The FPP system, which removes carbon forming components, sulfur and containments from the fuel, can be beneficially applied to these systems as well. In addition, while catalytically active components are challenged by the above mentioned liquid fuel problems at all scales, even non catalytic engine components are challenged by these fuels, at small scales. For example, very small diesel engines can produce excessive carbon deposits that can rapidly block flow passages at the small scales of interest. These deposits can shut down small engines within hours. By using a small FPP system, carbon deposits are reduced and engine lifetimes greatly extended. This also applies to small continuous combustion gas turbine engines, Stirling engines, etc. and burners, where small flow passages, orifices and nozzles can rapidly plug with carbon and containments associated with conventional liquid fuels. While this problem is well known for liquid fuel derived from petroleum, the problem is even more severe for liquid fuels derived from coal. In these future fuels, carbon forming compounds, sulfur content and fuel inorganic containment levels are even higher than those in petroleum derived fuels, making the FPP even more important with these fuels. While biomass derived liquid fuels are expected to have lower sulfur contents, the high carbon liquid compounds and even solid carbon containing components need to be separated by an FPP prior to biomass liquid fuel use in the above mentioned systems. By using the FPP with these small systems, and current and evolving fuels, the carbon production and plugging problems noted above are mitigated.

The FPP can be applied where there are combustion and/or pollution control benefits in separately burning light and heavy fuel components. For example, the easy-to-vaporize, mix and burn light fractions could be used to initiate burning or create an envelope for the more difficult to vaporize, mix and burn heavy fractions. For diesel engines, the light fractions could be used in prechambers or separate injectors that then promote the more efficient burning of heavier components, leading to reduced particulate emissions. Also, stoichiometries of light and heavy component combustion can be tailored to control NOx from these engines. The FPP could also be used to create a stored light component fraction that could be used in engine startup or load transients, where pollutants (unburned hydrocarbons and soot) are heaviest. In terms of continuous combustion gas turbine systems, the light fractions can be used to ignite and facilitate the burning of heavier components to reduce unburned hydrocarbon and promote NOx control.

Also, for very heavy component fuels, the FPP separated very heavy ends could even be burned separately in an external combustor and the heat used to preheat the compressed air ahead of the light ends fueled topping combustor. By burning the heavy ends externally, the carbon forming sulfur forming and metal containments are segregated away from expensive engine components and these heavy compounds processed in a small separate combustion and heat transfer system that can be specifically designed to deal with these undesirable compounds. The net effect would be longer engine life and less pollution. Relative to diesel engines a similar strategy can be applied, where the lighter ends are burned in the diesel engine with the heavier ends used to drive a turbocharger/supercharger that pressurizes the diesel engine. The high NOx diesel exhaust can then be directly sent to catalytically active NOx control unit, since carbon forming sulfur compounds can containments have been removed from the fuel by an FPP system. Since the turbocharger combustion would have much less carbon and NOx emissions than the main diesel, these gases would not have to go through the catalytically active pollution control component, thus extending pollution control equipment life and reducing maintenance costs. Therefore, by integrating an FPP with engines, substantial pollution control benefits can be derived.

Another approach with the FPP is to take the separated heavy ends fraction and chemically treat these components to upgrade their quality. For example, the smaller fraction of heavy ends could be separately treated with hydrogen to produce lighter compounds and to convert sulfur to H2S. The H2S could then be processed to an oxide gas or even elemental sulfur in a separate reactor. The remaining upgraded fraction could then be combined back with the light ends for use in the fuel cell, engine, etc.

The above examples show that the FPP approach can be combined with fuel desulfurizer, reformers, fuel cells, engines, boilers and fuel upgrading reactors in many innovative ways to allow carbon forming, and sulfur and containment containing liquid fuels to be reliably used in modern power and/or heat generating systems.

For the non-fuel cell applications, the FPP would work the same way as for the fuel cell applications. However, the degree of fuel fractionation and desulfurization and the disposition of the heavy ends would depend on the specific application and fuel type.

The invention claimed is:

1. A process for converting a fuel into reformulated fuel for use in a fuel cell or other energy-producing systems, the process comprising the steps of fractionating the fuel into a light fractionate and a heavy fractionate, and reformulating the light fractionate in a steam reformer into a reformate which is suitable for use as a fuel for the fuel cell or other energy-producing device.

2. A process as in claim 1 in which the fractionating step is carried out by a step selected from the group consisting of boiling point fractionation, vacuum fractionation, vacuum distillation, filtration, membrane separation, and adsorption.

3. A process as in claim 1 and further including the step of desulfurizing the light fraction.

4. A process as in claim 3 in which the desulfurizing step is carried out by a step selected from the group consisting of adsorption and hydrodesulfurization.

5. A process as in claim 1 in which the reformulating step is carried out by reforming the light fractionate at a temperature below 600° C. to produce a first reformate, and reforming the first reformate at a temperature above 650° C. to produce a second reformate.

6. A process as in claim 1 including the step of burning the heavy fractionate to produce heat, and adding the heat to the steam reformer in the reformulation step.

7. A process as in claim 6 in which the step of burning the heavy fractionate is carried out by the steps of wicking the fuel to a heated surface, vaporizing the fuel from the heated surface, partially mixing the vaporized fuel with air, and stabilizing the flame on porous screens surrounding the wick and flame.

8. A process for converting a certain portion of a first fuel into heat and an other portion of the first fuel into a second fuel for use in a fuel cell or in other energy producing devices, the process comprising the steps of fractionating the certain portion into a light fractionate and fractionating the other portion into a heavy fractionate, and directing the heavy fractionate into a holding vessel for subsequent use as the second fuel which is suitable for burning to produce heat or other energy.

9. A process as in claim 8 and further including the step of directing a portion of the heavy fractionate in heat exchange relationship with the first fuel before the fractionating step.

10. A process as in claim 8 and further including the step of burning a portion of the heavy fractionate in the holding vessel to produce heat.

11. A process as in claim 8 and further including the step of desulfurizing the light fraction to produce a desulfurized fuel.

12. A process as in claim 11 in which the desulfurizing step is carried out by a step selected from the group consisting of adsorption and hydrodesulfurization.

13. A process as in claim 11 including the step of using the desulfurized fuel to drive an engine or combustor that has catalytic components.

14. A process as in claim 8 and further including the step of reformulating the light fractionate into a reformate which is suitable for use as a third fuel for the fuel cell or other energy-producing device.

15. A process as in claim 14 and further including the steps of burning a portion of the heavy fractionate in the holding vessel to produce heat, and adding the heat from the burning step into the step of reformulating the light fractionate.

16. A process as in claim 14 in which the reformulating step is carried out by reforming the light fractionate at a temperature below 600° C. to produce a first reformate, and reforming the first reformate at a temperature above 600° C. to produce a second reformate.

17. A process as in claim 8 in which the fractionating step is carried out by a step selected the group consisting of boiling point fractionation, vacuum fractionation, vacuum distillation, filtration, membrane separation, and adsorption.

18. A process as in claim 8 including the step of burning the light fractionate to drive an engine or a combustor.

19. A process as in claim 8 and further including the steps of wicking the second fuel to a heated surface, vaporizing the second fuel from the wick, partially mixing the vaporized second fuel with air, and ingesting the mixture into an engine.

* * * * *

UNITED STATES PATENT AND TRADEMARK OFFICE
CERTIFICATE OF CORRECTION

PATENT NO. : 7,303,598 B1  Page 1 of 1
APPLICATION NO. : 10/796592
DATED : December 4, 2007
INVENTOR(S) : Mehdi Namazian et al.

It is certified that error appears in the above-identified patent and that said Letters Patent is hereby corrected as shown below:

Add the following to the title page:

Item (60), Related U.S. Application Data

Provisional application No. 60/452,325, filed on Mar. 5, 2003

Signed and Sealed this

Fifteenth Day of April, 2008

JON W. DUDAS
*Director of the United States Patent and Trademark Office*